Figure 1:
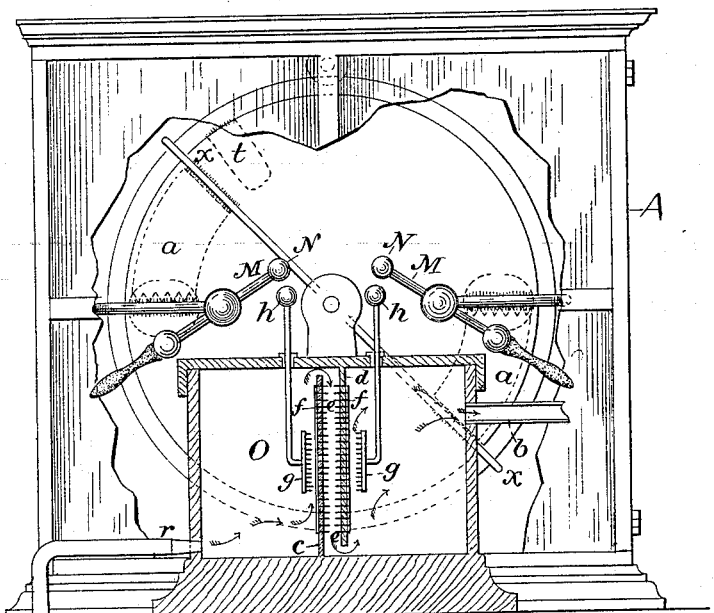

(No Model.)

H. D. HALL.
OZONE APPARATUS.

No. 282,190. Patented July 31, 1883.

ATTEST:
J. A. Hurdle
Thos. Toomey

INVENTOR:
Henry D. Hall
by H. C. Townsend
Atty

UNITED STATES PATENT OFFICE.

HENRY D. HALL, OF NEW YORK, N. Y.

OZONE APPARATUS.

SPECIFICATION forming part of Letters Patent No. 282,190, dated July 31, 1883.

Application filed September 26, 1882. (No model.)

*To all whom it may concern:*

Be it known that I, HENRY D. HALL, a citizen of the United States, and a resident of New York, in the county of New York and State of New York, have invented a certain new and useful Ozone Apparatus, of which the following is a specification.

My invention relates to apparatus for producing ozone; and the object of the invention is to furnish a means simpler, cheaper, and more effective in producing a thorough ozonification of the air or gas than the apparatus hitherto employed. Instead of using the high-tension spark from an induction-coil, or depending upon electrical induction through a non-conductor, as heretofore, I avail myself of the direct action of statical electricity produced from a Holtz or induction electrical machine, and diffused through or over a space through which a current of air or gas is forced by a blower or any other suitable means.

For the purpose of carrying my invention into effect I employ for an ozonizer a suitable box provided with diffusing-surfaces of extended area systematically roughened, serrated, or provided with points in such a way that the electricity may be diffused from one series of points to the other, and I so construct or arrange the box that the current of air or gas may be caused to pass between the two surfaces and in contact with them, so as to become thoroughly ozonized. I also use a statical electric machine of improved pattern, which is so constructed as to be self-charging, and is inclosed in an air-tight case and thoroughly protected from moisture, so that the apparatus may be put to practical use at any and all times, and without previous manipulation by hand, for the purpose of electrically charging the electrical machine. I by preference use a multiple-plate machine, so as to produce the volume of electricity which I find to be requisite for obtaining ozone in large quantities. In utilizing the electricity produced by a static electrical machine of the Holtz or similar pattern I do not depend upon the production of sparks, as in the induction-coil apparatus heretofore employed; but I so construct and adjust the parts as to prevent the formation of sparks and to produce a diffusion or escape of the electricity over a large surface and across a space through which the confined current of air or gas is caused to pass by any suitable agencies. My invention therefore differs in this essential respect from all previous practical methods of producing ozone, in that I neither depend upon inductive action through a non-conductor, as in the Siemens ozonizer, nor upon the formation of sparks by an induction-coil, which is uncertain in its action and liable to get out of order; but I employ the static electricity generated from a Holtz or similar electrical machine, which electricity I use in a diffused form or in a constantly-flowing state, and not in the form of a spark.

My invention consists in the combination of a Holtz or improved induction statical electric machine, of two oppositely-charged series of points so adjusted with relation to one another, or electrically connected with the machine, that the electricity will pass in a constant stream from one series to the other, and means for forcing a current of air or gas across or through the space between said series of points.

My invention consists, further, in the combination, with a self-charging Holtz machine inclosed in an air-tight case, of two oppositely-charged surfaces or series of points, from one to the other of which the electricity is caused to diffuse or escape, and a blower or other suitable apparatus for compelling a circulation of a confined body of air or gas through the intervening space.

My invention consists, also, in a novel construction of ozonizer, the essential characteristic of which is two parallel diffusing metallic surfaces systematically roughened, serrated, or provided with points, so as to induce a diffused action of the electricity across the intervening space and from one series of points to the other, said surfaces being inclosed in a suitable casing constructed to allow the passage of a current of air or gas through the space between said surfaces and in contact with the series of points.

My invention consists, further, of certain combinations of apparatus and certain improvements that will be specified in the claims.

Figure 2:
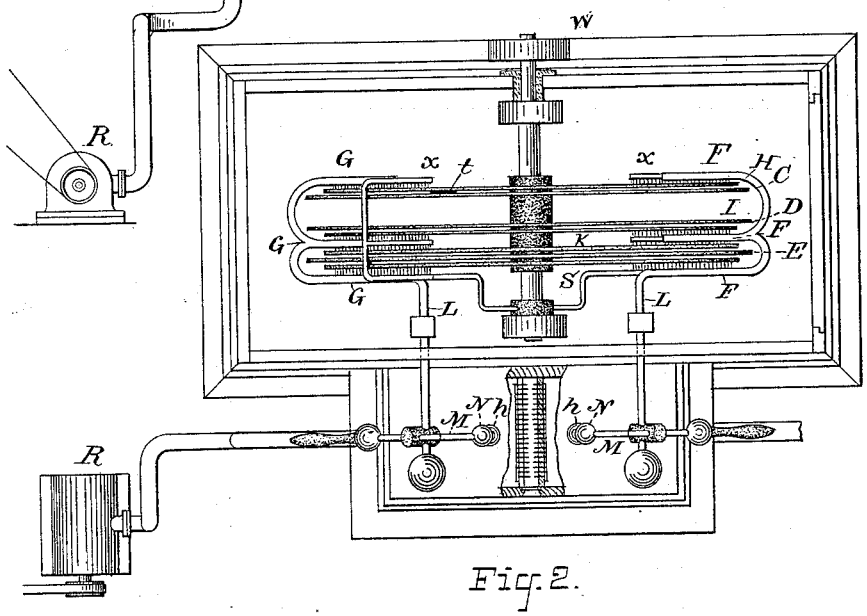

In the accompanying drawings, Figure 1 is a view showing the apparatus in side view and partial section, the machine being in side view and the ozonizer in vertical central section. Fig. 2 is a top view of the apparatus.

A indicates an air-tight case inclosing the stationary and moving plates or disks of a Holtz machine of any approved pattern.

C D E are three stationary induction-plates, each provided with the customary armatures $a$ in proximity to openings or windows in said plates.

F and G are respectively the positive and negative combs of four revolving disks, H I K S, each of which disks is arranged with relation to a stationary disk or plate and two combs, F and G, in the usual way. The three similar combs F are all supported from a common conducting-rod, L, which passes through an air-tight opening in the side of the case, while the combs G are supported in the same manner from a rod, L'. The rods L L' terminate on the exterior of the case in the usual balls or knobs, through which slide rods M, carrying smaller knobs N N', which latter, in effect, are the terminals of the machine. Secured permanently to each stationary disk is a piece of cat-skin, $t$, resting lightly in contact with the movable disks, by means of which the machine is made self-charging, so that all that is required in order to produce the electricity is to start the engine or motor by which it is driven, which motor is connected to the machine by a belt passing over a pulley, $w$, secured to the shaft on which the disks are mounted, or by any other suitable means.

At X X are indicated the usual brushes or combs, mounted on a cross-arm which is not insulated, but is connected with the ground, the principal function of which brushes is to prevent a change of polarity on the two sides of the machine.

Placed within the case is a dish of potash or similar hygroscopic substance, by means of which the apparatus is kept dry and in constant condition for use.

Any number of revolving and stationary disks or plates may be used, and any form of internal parts may be adopted in place of that shown. The multiple plates are used in order to produce a volume of electricity sufficient to ozonize the air or gas in practical quantity.

A form of ozonizer constructed in accordance with my invention is shown at O. It consists of a box or casing of any suitable shape, provided with entrance $r$ for the air or gas, and an exit, $b$, for the ozonized air or ozone. A partition, $c$, attached to the bottom of the box, extends across the box and nearly to the cover, a narrow slit or opening being left at the top. A similar partition, $d$, attached to the top, extends nearly to the bottom. The purpose of thus arranging the openings and the partitions is to cause a retardation of the air-current and thorough dispersion of the air or gas throughout the space between the two partitions, so that it may be thoroughly and uniformly subjected to the action of the electricity diffused across the space between the two partitions, which themselves may constitute the diffusing-surfaces oppositely charged, or, as is here shown, may be of wood or similar non-conducting material, and support a series of points, $e\ e$, passing through the partition, and all in electrical connection with a back plate, $f$, consisting of tin-foil or other conducting material. By thus constructing the two surfaces of two series of points presented to one another the silent escape of the electricity across the intervening space is aided, and of course the formation of sparks prevented. The electricity is thus diffused over a large area, and a thorough ozonification of the air between the two surfaces or areas is produced. I do not limit myself to any particular method of constructing the two surfaces, as it is only necessary, in order to effect the object of an extended diffusion over a large area, that the two surfaces should be systematically roughened, serrated, or in any manner made to present a series of acute points to one another. It is therefore evident that the object might be attained by the use of plates of metal for the partition-plates, instead of wood, the surfaces of said plates being roughened or serrated in any manner, so as to present a series of minute points that will tend to assist the escape, and thus cause a diffusion of the electricity over a large surface. The two surfaces may be connected directly with the positive and negative terminals of the machine, or with the positive and negative series of combs or brushes, although I prefer, in general, to use the arrangement to be now described. If connected directly, they should be sufficiently near one another to prevent the formation of the disruptive spark, which occurs when two electrodes are separated so far that an accumulation of electricity is required before the density becomes sufficient to leap the intervening space. In the arrangement herein shown the two diffusing-surfaces $e\ e$ are connected indirectly with the terminals of the machine by the two combs or brushes $g\ g$, which are attached to rods terminating on the outside of the box in knobs $h\ h$, and are presented to the rear of the plates $f$, from which the series of points $e$ project, but do not touch the same. The terminals $h\ h$ are placed sufficiently near the machine terminals to form a break across which the spark jumps. I find that the separation at this point by retarding the spark tends to increase the tension at the brushes $g\ g$, and also decreases the tendency to the formation of sparks at those points. At the combs $g\ g$ there is a diffusion across the space intervening between them and the back plates, so that the air or gas is subjected to the action of the electricity at this portion of its path, as well as that portion which lies between the series of points $e\ e$. The interposition of the combs $g\ g$ also assists in diffusing the electricity over the whole area of the plate and the connected points.

The break which I find it desirable to form at $h$ might obviously be formed at one side only. The machine may be so constructed that the break shall be at some other point instead of at *h*, and it might obviously be formed at any point between the combs or brushes *g g* and the diffusing-surfaces.

R indicates a blower connected to the pipe *r* for producing a circulation of air through the closed box or casing. Other means, natural or artificial, might be used in producing a circulation through the box. No particular form of box or casing is required. It is only necessary that it should be provided with the diffusing-surfaces between which the air is compelled to pass, said diffusing-surfaces being charged from a Holtz or induction electric machine. I do not limit myself to any particular form of Holtz machine, or to any particular number of induction-plates. The apparatus, as thus constructed, is useful in producing ozone or ozonized air in large quantities for industrial purposes, for the purification of air or noxious gases, as a material assistance to ventilation in hospitals or large public buildings, as theaters, &c., and for any of the uses to which ozone apparatus is usually applied.

On account of the simplicity of the apparatus, and the directness with which the electricity is produced by the expenditure of power, and with which it is applied to the air or gas, my apparatus is much better adapted to the continuous and cheap production of ozone or ozonized air on a large scale than the apparatus heretofore employed, in which latter the electricity generated by the power or battery employed is utilized only through the intervention of an induction-coil, in which process there is, of necessity, a loss in the conversion of the electricity from the dynamo-machine or generator into the high-tension current required.

In addition to the advantages mentioned, I have found that there is a practical advantage in the use of the induced statical electricity on account of its high diffusive tendency.

I am aware that the Holtz machine has been used to produce ozone, and also that ozonators have been employed composed of parallel plates provided with points between which currents of air or oxygen were passed, and I lay no claim to the separate use of these devices.

What I claim as my invention is—

1. An ozone apparatus comprising, in combination, an induction statical electrical machine, two parallel oppositely-charged series of points contained in a closed case and adjusted and connected to the machine, so that there will be a diffusion of the electricity from one series to the other, and means for compelling a circulation between the two series of points of the air or gas to be ozonized.

2. The combination, with a Holtz self-charging electrical machine having multiple revolving plates and contained in an air-tight case, of two oppositely-charged parallel diffusing-surfaces contained in a closed case and systematically roughened, serrated, or provided with points, said surfaces being adjusted with relation to one another, so that there will be an escape or diffusion of the electricity across the intervening space instead of a disruptive spark.

3. The combination, with a self-charging induction statical electric machine contained in a closed case, of two oppositely-charged parallel diffusing-surfaces, formed as described, and means for compelling a circulation of the air or gas to be ozonized between and in contact with said surfaces.

4. The combination, with a machine for producing static electricity, of two parallel series of points in electrical connection with the terminals of the machine, and adjusted to allow of the constant escape of the electricity across the intervening space, a containing case or box for the same, and a blower or its equivalent, as described, for compelling a circulation of the air or gas to be ozonized through said intervening space.

5. The combination, substantially as described, of the box having two partitions, one reaching nearly to the top and the other nearly to the bottom of the box, entrance and exit pipes arranged as described, one at the bottom and the other at the top of the box, and a series of conducting-points arranged over the entire opposing-surfaces of the partitions projecting into the intervening spaces, substantially as and for the purpose set forth.

6. The combination, substantially as described, of the parallel series of conducting-points arranged on opposite sides of the air-duct, the common backing-plate, and the combs or brushes presented to the rear of said plates and attached to rods passing through the walls of the box.

7. The combination of the static electrical machine, the ozonizer containing the parallel diffusing-surfaces, the combs or brushes separated from said surfaces, but arranged to diffuse to the same, and the terminals *h h* for said brushes, separated from the machine terminals, so as to produce a series of breaks in the discharge while the machine is in motion.

8. The combination, with the two partition-plates, one having an opening at the top and the other at the bottom, of the two series of points projecting from metallic conducting-plates into the space between said partition-plates, combs or brushes presented to the metallic conducting-plates and connected to the charging machine, and entrance and exit openings arranged, as described, so that the air or gas circulating in the box is compelled to come in contact with several series of charged diffusing-points.

Signed at New York, in the county of New York and State of New York, this 21st day of September, A. D. 1882.

HENRY D. HALL.

Witnesses:
   THOS. TOOMEY,
   HENRY C. TOWNSEND.